United States Patent
Bassett

(10) Patent No.: US 9,292,695 B1
(45) Date of Patent: Mar. 22, 2016

(54) SYSTEM AND METHOD FOR CYBER SECURITY ANALYSIS AND HUMAN BEHAVIOR PREDICTION

(71) Applicant: Gabriel Bassett, Huntsville, AL (US)

(72) Inventor: Gabriel Bassett, Huntsville, AL (US)

(*) Notice: Subject to any disclaimer, the term of this patent is extended or adjusted under 35 U.S.C. 154(b) by 77 days.

(21) Appl. No.: 14/249,496

(22) Filed: Apr. 10, 2014

Related U.S. Application Data

(60) Provisional application No. 61/810,506, filed on Apr. 10, 2013.

(51) Int. Cl.
*G06F 11/00* (2006.01)
*G06F 21/57* (2013.01)

(52) U.S. Cl.
CPC ..................... *G06F 21/577* (2013.01)

(58) Field of Classification Search
CPC .................... H04L 63/1408; H04L 63/1416
USPC .......................................................... 726/22
See application file for complete search history.

(56) References Cited

U.S. PATENT DOCUMENTS

| | | | |
|---|---|---|---|
| 7,013,395 B1* | 3/2006 | Swiler | H04L 63/1433 713/151 |
| 8,312,540 B1* | 11/2012 | Kahn | G06F 21/552 713/183 |
| 8,701,190 B1* | 4/2014 | Chau | G06F 21/56 709/223 |

* cited by examiner

*Primary Examiner* — Teshome Hailu
(74) *Attorney, Agent, or Firm* — David E. Mixon; Bradley Arant Boult Cummings LLP

(57) ABSTRACT

A method for analyzing computer network security has been developed. The method first establishes multiple nodes, where each node represents an actor, an event, a condition, or an attribute related to the network security. Next, an estimate is created for each node that reflects the case of realizing the event, condition, or attribute of the node. Attack paths are identified that represent a linkage of nodes that reach a condition of compromise of network security. Next, edge probabilities are calculated for the attack paths. The edge probabilities are based on the estimates for each node along the attack path. Finally, an attack graph is generated that identifies the easiest conditions of compromise of network security and the attack paths to achieving those conditions.

12 Claims, 8 Drawing Sheets

Economic Information Security Organization Model

SYSTEM AND METHOD FOR CYBER SECURITY ANALYSIS AND HUMAN BEHAVIOR PREDICTION

CROSS-REFERENCE TO RELATED APPLICATIONS

This application claims priority from U.S. Provisional Patent Application No. 61/810,506 entitled "SYSTEM AND METHOD FOR CYBER SECURITY ANALYSIS AND HUMAN BEHAVIOR PREDICTION" that was filed on Apr. 10, 2013.

FIELD OF THE INVENTION

The invention relates generally to a method for cybersecurity analysis based on human behavior.

BACKGROUND ART

Risk assessment and management are required for cyber security in both the public and private sectors. The job of assessing information security has generally fallen to analysts specialized in computer system security. However, standards for risk assessment and management which have proved capable for handling standard engineering risk have typically not proved as useful in assessing the risk of human attack on an Information System (IS).

Generally, security analysts make a risk assessment by scoping the risk as a vulnerability or compliance control. They may use the assessment provided by a vulnerability scanning tool or use a standard for vulnerability scoring such as the Common Vulnerability Scoring System (CVSS). Alternately, they may subjectively assign a likelihood and consequence based on the knowledge and experience. These approaches general assess only one or a few conditions associated with the risk, limiting the assessment's accuracy.

As vulnerabilities can be thought of as likely conditions, controls thought of as conditions which limit likelihood, and consequences as conditions of significant negative impact, risk assessment should include all conditions which facilitate (increase likelihood), inhibit (decrease likelihood), or impact. In other words, a risk cannot simply be defined by a vulnerability, but must also include its context. As information security risk usually involves a human possessing free thought and will, a risk analysis also should include their actions or events in the risk context.

SUMMARY OF THE INVENTION

In some aspects, the invention relates to a method for analyzing computer network security, comprising: establishing multiple nodes, where each node represents an actor, an event, a condition, or an attribute related to the network security; creating an estimate for each node that estimates the ease of realizing the event, condition, or attribute of the node; identifying attack paths, where the attack paths represent a linkage of nodes that reach a condition of compromise of network security; calculating edge probabilities for the attack paths based on the estimates for each node along the attack path; and generating an attack graph that identifies the easiest conditions of compromise of network security and the attack paths to achieving those conditions of compromise based on combined estimates of the ease of the attack paths and the application of actor attributes In other aspects, the invention relates to a method for analyzing for risk, comprising: establishing multiple nodes, where each node represents a threat actor, an event, a condition, or an attribute related to a defined risk; creating a conditional probability table (CPT) for each node that estimates the ease of realizing the event, condition, or attribute of the node; identifying attack paths along a path of nodes that result in a negative event; calculating necessary edge probabilities for an attack path based on the CPTs for each node along the attack path; and generating an attack graph that identifies the most likely attack paths based on the combined edge probabilities of the attack graph.

In other aspects, the invention relates to a method for analyzing for risk, comprising: establishing multiple nodes, where each node represents a threat actor, an event, conditions, or an attribute related to a defined risk; creating a cost for each edge that estimates the ease of realizing an event or condition of the node; identifying attack paths along a path of nodes that result in a negative event; calculating necessary edge probabilities for an attack path based on the costs for each node along the attack path; and generating an attack graph that estimates the most easily achieved attack paths based on the combined costs of the attack graph.

In other aspects, the invention relates to a method for prediction of behavior of a rational actor, comprising: establishing multiple nodes, where each node represents actors, attributes, events and conditions related the actor's actions; creating a score for each node that implies the ease with which the event or condition of the node will be realized based on parent events, conditions, actors, and attributes related to the actor's actions; identifying action paths along a path of nodes that result in an event or condition; calculating edge probabilities for a path based on a calculated conditional probability table (CPT) for each node along the action path that estimates the ease of realizing an event or condition of the node; and generating an action graph that identifies the most likely action paths based on the combined edge probabilities of the action graph.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
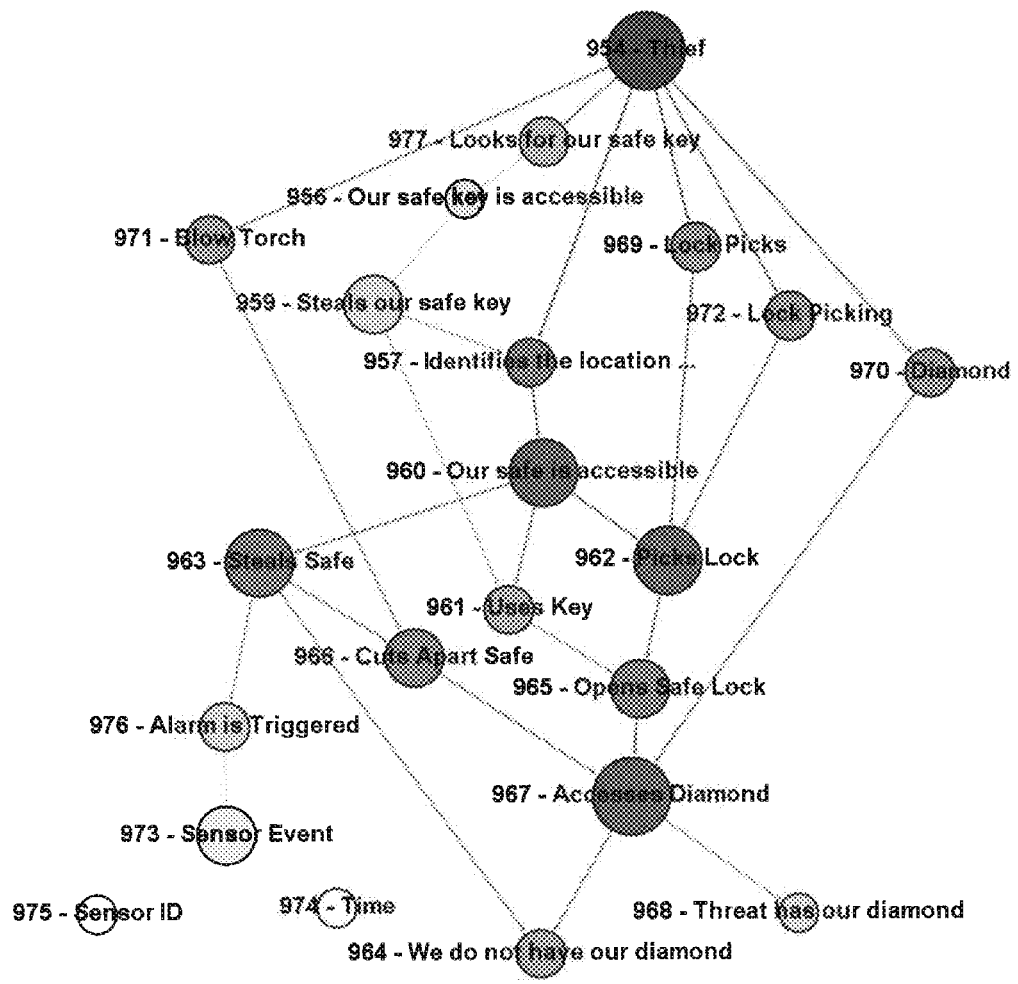
FIG. 1 shows an example of an attack graph utilized in one embodiment of the present invention.
Figure 2:
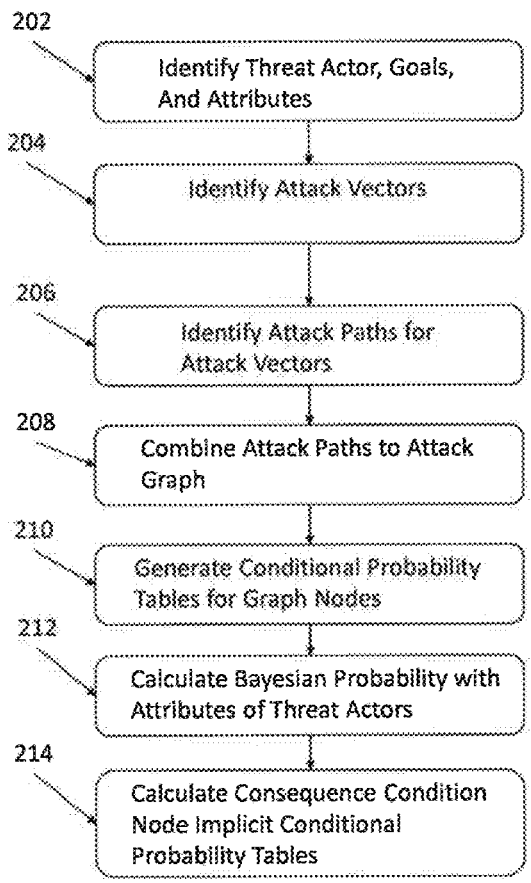
FIG. 2 shows a flow chart depicting a method for calculating the Bayesian action probability utilized in one embodiment of the present invention.
Figure 3:
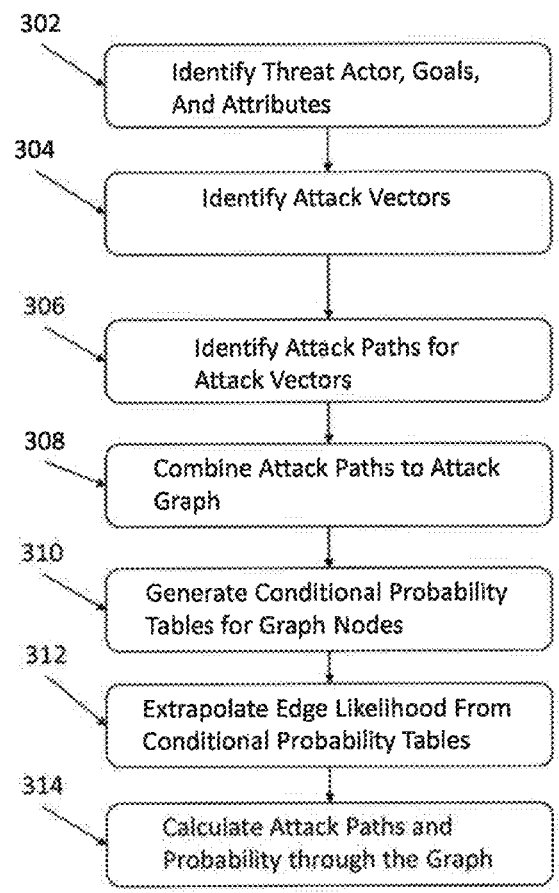
FIG. 3 shows a flow chart depicting a method for calculating the Bayesian attack probability utilized in one embodiment of the present invention.
Figure 4:
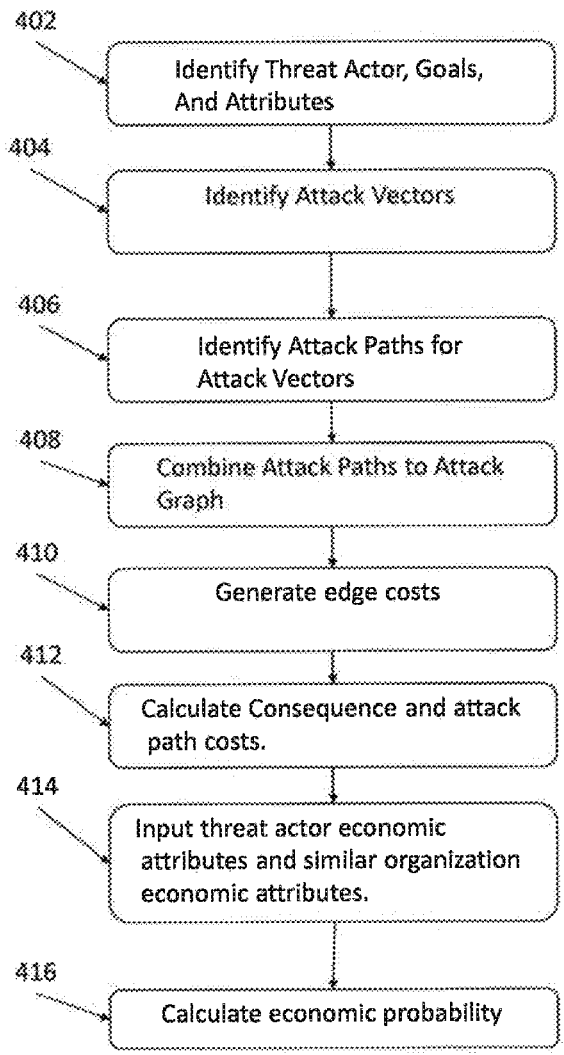
FIG. 4 shows a flow chart depicting a method for calculating the Economic action probability process utilized in one embodiment of the present invention.

People prioritize what they do in information security management based on the risks they identify and manage. Those risks include a component based on human free will which makes the task of Information Security (IS) significantly more complex. Attack graphs provide a method for handling the complexities associated with free will in the likelihood that a risk may occur. Beings with free will can be described as rational actors. In the present invention, rational actors with goals which negatively impact the organization documenting the attack graph are known as threat actors (or "threats"). The present invention defines attack vectors, expands them to attack paths, and combines them to form an attack graph. This attack graph will be used to identify both the likelihood of a specific node in the graph, as well as the most likely path to reach the node. Nodes (depicted as circles in the graphs used herein) represent actors, conditions, events, and attributes. This information can be used to plan a practical information security defensive strategy.

The present invention includes a method for documenting the context of the likelihood of a risk using attack paths and attack graphs. Attack paths begin with a threat actor, progress through events and conditions, and end in a consequence which is an absorbing state represented by a condition. This method has four major benefits: 1) it allows for the documentation of risk likelihood in the unique context of an organization's information systems; 2) it allows for analysts to both provide their subjective assessment while still wholly capturing the various conditions and events which support the assessment; 3) it provides the ability to discover new paths and prioritize risks based on their importance in the overall security posture and 4) it allows differentiation between threat actors based on their attributes.

In addition to the attack paths, attributes may be added to the attack graph. It is the combination of attributes with attack paths in the graph that expand previous work in attack graphs into a practically applicable method of analysis. These attributes facilitate the identification of precursors necessary to limit the availability of attack paths based on the threat actor. Attributes also provide a way to classify information, useful in providing filtered views of the graph. They also provide the ability to create constructs which facilitate information sharing. Finally, attributes are critical in linking operational events to the graph for operational detection.

By building the attack graph using analyst and intelligence attack paths and using Bayesian Network (BN) Conditional Probability Tables (CPTs) to account for pre-cursor attributes, a significant deviation from current attack graph and risk assessment practices is created to provide a new and unique solution. The additional capabilities associated with attributes in the graph provide further of the concept to further applications.

Building an Attack Graph

Defining Risks:

Risk Management is a well-defined and understood concept. Risk is commonly made of the two orthogonal values of likelihood and impact. Likelihood represents the chance that a risk will be realized. Impact represents the consequence (usually negative) of realizing the risk. There are five basic ways of handling risk (avoid, accept, mitigate, transfer, and ignore).

Risk management as it applies to information security is more complex as the likelihood of any given risk is significantly based on the free will of the threat actor who may be represented as a rational actor. As an example, the likelihood of losing a diamond locked in a safe may be low. However, the likelihood of having the diamond stolen by a thief may be high as the threat actor may choose to steal the key, pick the lock, or simply steal the safe and physically open it at his discretion. These various ways of accomplishing the goal (stealing the diamond) are examples of attack vectors. For example, an individual score p(X) is the probability that any attacker in the assessed threat can, and will reach node X during an attack. Equivalently, among all attackers that attempt to compromise the given information system during any given time period, p(X) is the percentage of attackers that can, and will reach node X.

Threat and Goal:

Identification of attack vectors is the first step in producing the attack graph. As implied above, creating attack vectors requires an identified goal. To define a goal, a threat actor must be defined. There are various methods for identifying threats and their associated goals already documented. As an example, we will define a threat of "thief" with a goal of "has our diamond" (Table 1).

TABLE 1

| Threat Actor and Goal Condition | |
|---|---|
| Threat Actor | Thief |
| Coal Condition | Has Our Diamond |

Attack Vectors:

Once the threat actor and his goals are identified, attack vectors are drafted. A method for identifying attack vectors is to survey those involved with the information system (developers, users, operators, administrators, testers, auditors, etc) as to what attack vectors they believe have merit in the exploitation of an information system. In Table 2, we capture the three previously defined attack vectors.

TABLE 2

| Initial Attack Vectors | | | |
|---|---|---|---|
| | Attack Vector 1 | Attack Vector 2 | Attack Vector 3 |
| Vector Name | Steal The Key | Pick The Lock | Steal The Safe |
| Threat Actor | Thief | Thief | Thief |
| Goal Condition | Has Our Diamond | Has Our Diamond | Has Our Diamond |

Attack Paths:

The list of attack vectors is used to produce a list of attack paths. Attack paths start at a threat actor and proceeds through event and condition steps to the attacker's goal. Events can be defined as actions taken, usually exploitations of the threat actor. Conditions can be defined as states of the information system. An example exploit-condition pairing would be: Condition—the key is hanging on the wall, Event—the threat actor takes the key. Table 3 represents a basic expansion of our previously defined attack vectors into attack paths.

TABLE 3

Initial Attack Paths

| Attack Path | Attack Path 1 | Attack Path 2 | Attack Path 3 |
| --- | --- | --- | --- |
| Attack Vector | Steal The Key | Pick The Lock | Steal The Safe |
| Threat Actors | Thief | Thief | Thief |
| Event/Condition 1 | Identifies the location of our Key | Identifies the location of our Safe | Identifies the location of our Safe |
| Event/Condition 2 | Our Safe Key is accessible | Our safe is accessible | Our safe is accessible |
| Event/Condition 3 | Steals Our Key | Accesses our safe | Accesses our safe |
| Event/Condition 4 | Identifies the location of our Safe | Picks Lock | Steals Safe |
| Event/Condition 5 | Our safe is accessible | Opens Safe Lock | We do not have our diamond |
| Event/Condition 6 | Accesses our safe | Accesses Diamond | Cuts Apart Safe |
| Event/Condition 7 | Uses Key | Steals diamond | Accesses Diamond |
| Event/Condition 8 | Opens Safe Lock | We do not have our diamond | Has Our Diamond |
| Event/Condition 9 | Accesses Diamond | | |
| Event/Condition 10 | Steals diamond | | |
| Event/Condition 11 | We do not have our diamond | | |

As should be readily evident in Table 3, there are significant commonalities between the attack paths. Additionally, all attack paths share specific events and conditions such as "accesses safe" as well as the threat actor "thief", consequence "we do not have our diamond", and threat actor goal "threat has our diamond". Table 4 aligns similar events and conditions.

TABLE 4

Initial Attack Paths

| Attack Path | Attack Path 1 | Attack Path 2 | Attack Path 3 |
| --- | --- | --- | --- |
| Vector Name | Steal The Key | Pick The Lock | Steal The Safe |
| Threat Actor | Thief | Thief | Thief |
| Event | Identifies the location of our Key | | |
| Condition | Our Safe Key is accessible | | |
| Event | Steals Our Key | | |
| Event | Identifies the location of our Safe | Identifies the location of our Safe | Identifies the location of our Safe |
| Condition | Our safe is accessible | Our safe is accessible | Our safe is accessible |
| Event | Accesses our safe | Accesses our safe | Accesses our safe |
| Event | Uses Key | Picks Lock | Steals Safe |
| Condition | | | We do not have our diamond |
| Condition | Opens Safe Lock | Opens Safe Lock | Cuts Apart Safe |
| Event | Accesses Diamond | Accesses Diamond | Accesses Diamond |
| Condition | Threat Has Our Diamond | Threat Has Our Diamond | Threat Has Our Diamond |
| Condition | We do not have our diamond | We do not have our diamond | |

In some embodiments, similar, though not exactly matching, conditions or events are combined to form attack paths. By example, if one attack path contains the event "walks through door", and a different attack path contains the event "enters house", the two are combined into a single event. In one embodiment, natural language processing (NLP) is used to identify similar events and/or conditions Defining a Graph:

A graph is defined as a pair G=(V, E) of sets such that $E \subseteq [V]^2$; thus, the elements of E are 2-element subsets of V. The elements of V are the vertices (or nodes, or points) of the graph G, the elements of E are its edges (or lines). Edges within directed graphs have a specific source node and target node. In the attack graph, four classes of nodes are defined: Conditions, Events, Actors, and Attributes. Conditions and Events will retain the previously provided definitions. Actors are defined as beings with free will. Attributes defined as the set of all characteristics of the other three node classes. Attributes may be observable or non-observable. Example conditions, events, and an actor are provided in Table 4.

The present invention uses three edge relationships: progression, predicate, and requirement. A progressive relationship is temporal and represents the progression of the attack paths. The source of a progression relationship may be an actor, condition, or event. The target must be the next condition or event in progression. Note that events may lead to events and conditions to conditions. Multiple progression relationships in or out of a node likely imply complex likelihoods. These will be handled through Bayesian Network (BN) Conditional Probability Tables (CPTs) as discussed later. Predicate and requirement relationships are directly tied to attributes. Predicate relationships end at an attribute node and may have any class of node for a source. Table 5 demonstrates multiple predicate relationships to attributes which can be added to our previous attack paths. This relationship is similar to the revised World Wide Web Consortium RDF/XML Syntax Specification.

TABLE 5

Example Predicates and Attributes

| Condition, Actor, Event Node, Attribute | Predicate Edge Relationship | Attribute Node |
| --- | --- | --- |
| Thief | Has | Lock Picks |
| Thief | Wants | Diamond |
| Thief | Has | Blow Torch |
| Thief | Knows | Lock Picking |
| Alarm is triggered | Triggers | Lock Picking |
| Sensor Event | Has | Time |
| Sensor Event | Has | Sensor ID |

Requirement relationships define where an attribute is necessary for a certain step. Requirement relationships end at an event or condition and have an attribute node for a source. Table 6 provides some requirement relationships for our example.

TABLE 6

Example Requirement Relationships

| Attribute Node | Requirement Edge Relationship | Condition or Event Node |
| --- | --- | --- |
| (Thief has) Lock Picks | Requirement for | Picks Lock |
| (Thief knows) Lock Picking | Requirement for | Picks Lock |
| (Thief has) Blow Torch | Requirement for | Cuts Apart Safe |

TABLE 6-continued

Example Requirement Relationships

| Attribute Node | Requirement Edge Relationship | Condition or Event Node |
|---|---|---|
| (Thief wants) Diamond | Requirement for | Accesses Diamond |

The example attack paths, attributes, and relationships could then be represented graphically as shown in FIG. 1. However, graphs are not an optimal way to visualize risks. The attack graph's lack of efficacy as a visualization tool will not be an issue. Note that the vector names, while important in helping us define our attack paths, are not relevant to the actual attack graph and not included.

Assessing Risk Using Attack Graphs

The present invention assesses the risk associated with the attack graph in two stages. First, it calculates the Bayesian likelihood of condition nodes with a negative impact, (hereafter referred to as "consequences"). Second, it calculates the most likely path an attacker will take to reach the consequences. The calculations make two assumptions: (1.) the attacker wants to reach the goal or goals we have assigned to him; and (2.) the attacker will take the most likely method for reaching their goal(s).

Defining Likelihood and Impact:

A Bayesian network is a Directed Acyclic Graph (DAG) which encodes the conditional relationships of nodes within the edges of the graph and the conditional probabilities of those relationships in CPTs assigned to each node. The CPTs of the nodes in the graph encode the join probability distribution of the graph. The Join Probability Distribution can be represented as:

$$P(X_1 \ldots X_n) = \Pi_{i=1}^n P(X_i | \text{parents} X_i) \quad \text{Equation 1:}$$

Where X represents the system described as the pair (G, Q) with G representing the DAG and with Q as the parameter set of the network.

For each condition and event in the network, a CPT is created with the Boolean parameters T and F representing the likelihood that a condition exists and that an event will take place. In the present invention, an analyst will provide a table of percentages. To simplify this, two definitions are established:

Definition 1—

A CPT is a conjunctive CPT if and only if the only case in which the 'true' probability is greater than zero and the 'false' probability less than one is the case in which all parents are true; and Definition 2—

A CPT is a complimentary CPT if and only if the only cases in which the 'true' probability is zero and the 'false' probability is one are those in which all events and conditions are false or those in which any attributes are false.

All threats are assigned the CPT represented in Table 7 for simplicity. This table indicates with 100% probability that the existence of the threat is true and with zero probability that the threat is false. Any uncertainty in the existence of a threat may be represented with a less definitive likelihood.

TABLE 7

Basic Threat CPT (Thief)
Node 954

| T | F |
|---|---|
| 1 | 0 |

The present invention follows the attack path starting with "Identifies the location of our safe", Node ID 977 in our example attack graph in FIG. 1. From this point on, we will use "Node ID" numbers rather than names. As shown in Table 8, if the thief Node 954 is true, there is a 50% chance he will find our key and a 50% chance he will not. However, if the thief is not true, there is zero chance he will find our key and 100%/o chance he will not. The invention continues this approach defining the likelihood of

TABLE 8

CPT For Node 977
Node 977

| 954 | T | F |
|---|---|---|
| T | .5 | .5 |
| F | 0 | 1 |

TABLE 9

CPT For Node 956
Node 956

| 977 | T | F |
|---|---|---|
| T | .3 | .7 |
| F | .05 | .95 |

TABLE 10

CPT For Node 959
Node 959

| 956 | T | F |
|---|---|---|
| T | .8 | .2 |
| F | 0 | 1 | nodes 956 and 959 in Tables 9 and 10.

Node 957 in FIG. 1 represents a complementary relationship representing that the thief may either steal our key first OR proceed directly to identifying the location of our safe. Table 11 depicts the CPT associated with this relationship. In this table, we see that if both 954 and 959 our false, then 957 will be false. However, if either 954 or 959 are true, there is an 80% chance the 957 will be true (the thief finds our safe).

TABLE 11

CPT for Node 957
Node 957

| 954 | 959 | T | F |
|---|---|---|---|
| F | F | 0 | 1 |
| T | F | .8 | .2 |
| F | T | .8 | .2 |
| T | T | .8 | .2 |

Looking farther down the graph, a table very similar to the conjunctive relationship is shown. Table 12 represents the CPT for node 962, where the thief "picks the lock". It represents three practical cases. If the thief has accessed the safe, has lock picks, and knows lock picking, there is a 90% chance he will pick the lock. If he has accessed the safe, has lock picks, but does not know lock picking, there is still a 20% chance he will pick the lock. In all other cases, there is no chance he will pick the lock.

TABLE 12

CPT for Node 957
Node 962

| Node 960 | Node 969 | Node 972 | T | F |
|---|---|---|---|---|
| F | F | F | 0 | 1 |
| T | F | F | 0 | 1 |
| F | T | F | 0 | 1 |
| T | T | F | 2 | 8 |
| F | F | T | 0 | 1 |
| T | F | T | 0 | 1 |
| F | T | T | 0 | 1 |
| T | T | T | .9 | .1 |

In FIG. 1, Node 964, "We do not have our diamond" represents the consequence. Note that this is slightly different than the thief's goal of Node 968, "Threat has our diamond". In some embodiments, the difference between a threat's goal and the consequence may allow for unique mitigations of the consequence.

Assignment of impact is a key component of risk. The impact should be assessed against an organization's mission with substantiating documentation. In this example, if the diamond is a personal possession, its loss is assessed as depriving the owner of the happiness its beauty brought. This may warrant a significant impact. However, the diamond may be an insured business asset in which case the impact is higher insurance premiums and a requirement to install additional security and consequently a decrease in profit. This may warrant a lower impact than had the diamond been a prize personal prize possession.

While the CPT is able to arbitrarily express probability relationships between nodes, the three situations embodied above represent the most likely situations encountered in the attack graph. However, it should be clear that this method of analysis could be used in embodiments with more complex relationships. Note that in the relationships embodied above, the probability assigned is based on the analyst's subjective judgment. This is purposeful as analysts tend to provide the best results when not artificially constrained. In other embodiments, other methods are used to arrive at the probabilities documented in the CPT.

In one embodiment, the following additional logic for automatically generating conditional probability tables: A row in the conditional probability table is true if and only if all parents of class attribute are true and any parent of class actor, event, or condition is true. In this embodiment, all conditional probability tables must have at least one actor, event, or condition parent to be part of an attack path. This effectively equates to the node being reached progressively and fulfilling all attribute requirements while still following an event/condition path from an actor.

Calculating Bayesian Likelihood

As mentioned previously, the CPTs of the nodes in our graph will be used to determine the joint probability function for the network in the following example. For simplicity, the subgraph compromised of Nodes 954, 977, 956, 957, and 959 will be used. The joint probability function of this graph is documented in Equation 2. The conditional probability of Node 957 is defined in Equation 3 supported by Equations 4 through 7.

$$P(N954,N955,N956,N957,N959)=P(N954)P(N955|N954)P(N956|N955)P(N959|N954)P(N957|N954,N959) \quad \text{Equation 2:}$$

$$P(N957=T)=\Sigma_{N954,N959\in(T,F)}P(N957=T,N954,N959)=P(N957=T,N954=F,N959=F)+P(N957=T,N954=F,N957=T)+P(N957=T,N954=T,N957=F)+P(N957=T,N954=T,N957=T)=(0)(0)(0.86)+0.8)(0),(0.14)+(0.8)(1)(0.86)+(0.8)(1)(0.14)=0+0+0.69+0.11=0.8 \quad \text{Equation 3:}$$

$$P(N959=T)=\Sigma_{N956\in(T,F)}P(N959=T,N956)=P(N959=T,N956=T)+P(N959=T,N956=F)=P(N959=T|N956=T)\cdot P(N956=T)+P(N959=T|N956=F)\cdot P(N956=F)=(0.8)(0.175)+(0)(0.825)=14 \quad \text{Equation 4:}$$

$$P(N956=T)=\Sigma_{N955\in(T,F)}P(N956=T,N955)=P(N956=T,N955=T)+P(N956=T,N955=F)=P(N956=T|N955=T)\cdot P(N955=T)+P(N956=T|N955=F)\cdot P(N955=F)=(0.3)(0.5)+(0.05)(0.5)=0.175 \quad \text{Equation 5:}$$

$$P(N955=T)=\Sigma_{N954\in(T,F)}P(N955=T,N954)=P(N955=T,N954=T)+P(N955=T,N954=F)=P(N955=T|N954=T)\cdot P(N954=T)+P(N955=T|N954=F)\cdot P(N954=F)=(0.5)(1)+(0)(0)=0.5 \quad \text{Equation 6:}$$

$$P(N954=T)=1 \quad \text{Equation 7:}$$

As shown, the thief stealing the key has no appreciable effect on the chance that he identifies the location of our safe as it maintains an 80% likelihood. However, the likelihood of Node 959 is very significant to the probability that Node 961 is true.

The effect of attributes on a node's likelihood can be significant. By example, define a CPT and associated probability for Nodes 960, 969, and 972 to see the effect of attributes on Node 962. Keep in mind that, while Node 969 and 972 are currently only

TABLE 13

CPT For Node 969
Node 969

| 954 | T | F |
|---|---|---|
| T | 1 | 0 |
| F | 0 | 1 |

TABLE 14

CPT For Node 972
Node 972

| 954 | T | F |
|---|---|---|
| T | .9 | .1 |
| F | 0 | 1 |

TABLE 15

CPT For Node 960
Node 960

| 957 | T | F |
|---|---|---|
| T | .4 | .6 |
| F | 0 | 1 | associated with a single threat, in reality, the attack graph may have multiple threats associated with attributes. Additionally, the inclusion of attributes is critical to attack path calculations.

$$P(N969=T)=\Sigma_{N954\epsilon(T,F)}P(N969=T,N954)=P(N969=T, N954=T)+P(N969=T,N954=F)=1 \quad \text{Equation 8:}$$

$$P(N972=T)=\Sigma_{N954\epsilon(T,F)}P(N972=T,N954)=P(N972=T, N954=T)+P(N972=T,N954=F)=0.9 \quad \text{Equation 9:}$$

$$P(N960=T)=\Sigma_{N957\epsilon(T,F)}P(N960=T,N957)=P(N960=T, N957=T)+P(N960=T,N957=F)=0.44 \quad \text{Equation 10:}$$

Next, the probability of Node 962 is calculated in Equation 11 given the previous probabilities.

$$P(N962=T)=\Sigma_{N960,N969,N972\epsilon(T,F)}P(N957=T,N960, N969,N972)=P(N962=T,N960=F,N969=F, N972=F)+P(N962=T,N960=F,N969=T,N972=F)+ P(N962=T,N960=T,N969=F,N972=F)+P (N962=T,N960=T,N969=T,N972=F)+P(N962=T, N960=F,N969=F,N972=T)+P(N962=T,N960=F, N969=T,N972=T)+P(N962=T,N960=T,N969=F, N972=T)+P(N962=T,N960=T,N969=T,N972=T)= 0+0+0+(0.2)(0.44)(1)(0.1)+0+0+0+(0.9)(0.44) (1)(0.9)=0.0088+0.3564=0.3652 \quad \text{Equation 11:}$$

As shown in Equation 11, the threat having lock picks and knowing lock picking is the driver of the likelihood of this node. Should threats capable of picking locks be eliminated (or otherwise mitigated) in our attack graph, picking the safe lock would no longer contribute appreciably to the likelihood of loss of the diamond.

To prevent unrelated threats from influencing each other, the Bayesian likelihood will need to be calculated for each threat in the graph separately. In order to do so, an implicit CPT is defined for each consequence. All threats will be treated as parents represented by the probability of the consequence being true if only the threat is true and all other threats are false. The consequence true probability will be set to one for all records with a true parent. Based on this table and the per-threat likelihood of the consequence calculated previously and substituted for the parent likelihood of the associated threat, a final likelihood is produced.

In another embodiment, assume a new threat in the graph: "Kidnapper" with the node ID 1000. Assume that P(N964=T|N954=T,N1000=F)=0.05 and P(N964=T|N954=F,N1000=T)=0.02. Table 16 represents the implicit CPT for the consequence Node N964. Equation 12 would then represent the likelihood of not having the diamond (Node 964). A likelihood of 6.9% is shown, slightly below the 7% of simply adding the two likelihoods. This is logically reasonable as, since both cannot deprive the owner of the diamond, there is some interaction between the two threats.

TABLE 16

Implicit CPT for Node 964
Node 964

| Node 954 | Node 1000 | T | F |
|---|---|---|---|
| F | F | 0 | 1 |
| T | F | 1 | 0 |
| F | T | 1 | 0 |
| T | T | 1 | 0 |

$$P(N964=T|N954,N977)=\Sigma_{N954,N977\epsilon(T,F)}P \\ (N964=T|N954,N977)=0+0.046+0.019+ \\ 0.001=0.069 \quad \text{Equation 12:}$$

As can be noted from Equations 4, 6, 8, and 9, in some embodiments, the Bayesian probability is effectively the same as the basic probability derived from multiplying sequential 'true' likelihoods. While this achievement cannot be done in all cases as Equations 3, 5, 10, and 11 demonstrate, calculating the basic probability where feasible should provide significant performance improvements when implementing the calculation of likelihood.

Calculating Likely Attack Paths

The power of the attack graph lies not in its detailed visual representation, but in the math it facilitates. In one embodiment, it can be used to identify the most likely paths an attacker may take to reach their goal. The present invention provides a novel method for applying node weights to edges. Additionally, rather than adding weights and keeping the shortest as is normal in shortest-path algorithms, the present invention will multiply the weights and keep the longest. Additionally, this embodiment does not follow paths which include attribute nodes as attribute nodes are only meant to enable attack paths, not participate in them. Finally, in one embodiment, the shortest-path algorithm will be re-executed for each starting node (in this case each threat), combining the generated attack paths and ordering them by likelihood, at the conclusion of execution.

As the shortest path will require edge weights, it is necessary to retrieve these from the node CPTs. The Bayesian probability associated with the CPT row where only the associated edge is true, all parents with edge relationship type "requirement" are true, and no other parents with edge requirement type "progression" are true. This effectively utilizes the case where the edge and all required attributes are true which is most likely to reflect the highest probability case for the edge associated with the path. As noted above, these weights will be specific to a given threat actor in the graph.

Once edge weights have been assigned, the present invention identifies the individual path likelihood of each node. It should be expected that this will be less likely than the Bayesian likelihood of each node as the Bayesian likelihood represents the influence of all parents on the likelihood that a node will be reached while the path likelihood represents only the likelihood that a node will be reached along that individual path. Since the edge weights are specific to a given threat actor, the algorithm will need to be recalculated for each threat actor in the graph. While it is important that the algorithm be allowed to run until it has reached all consequences in the graph, for performance, it may be stopped once it reaches all threat goals, or allowed to run until it has reached all nodes in the graph.

Figure 6:
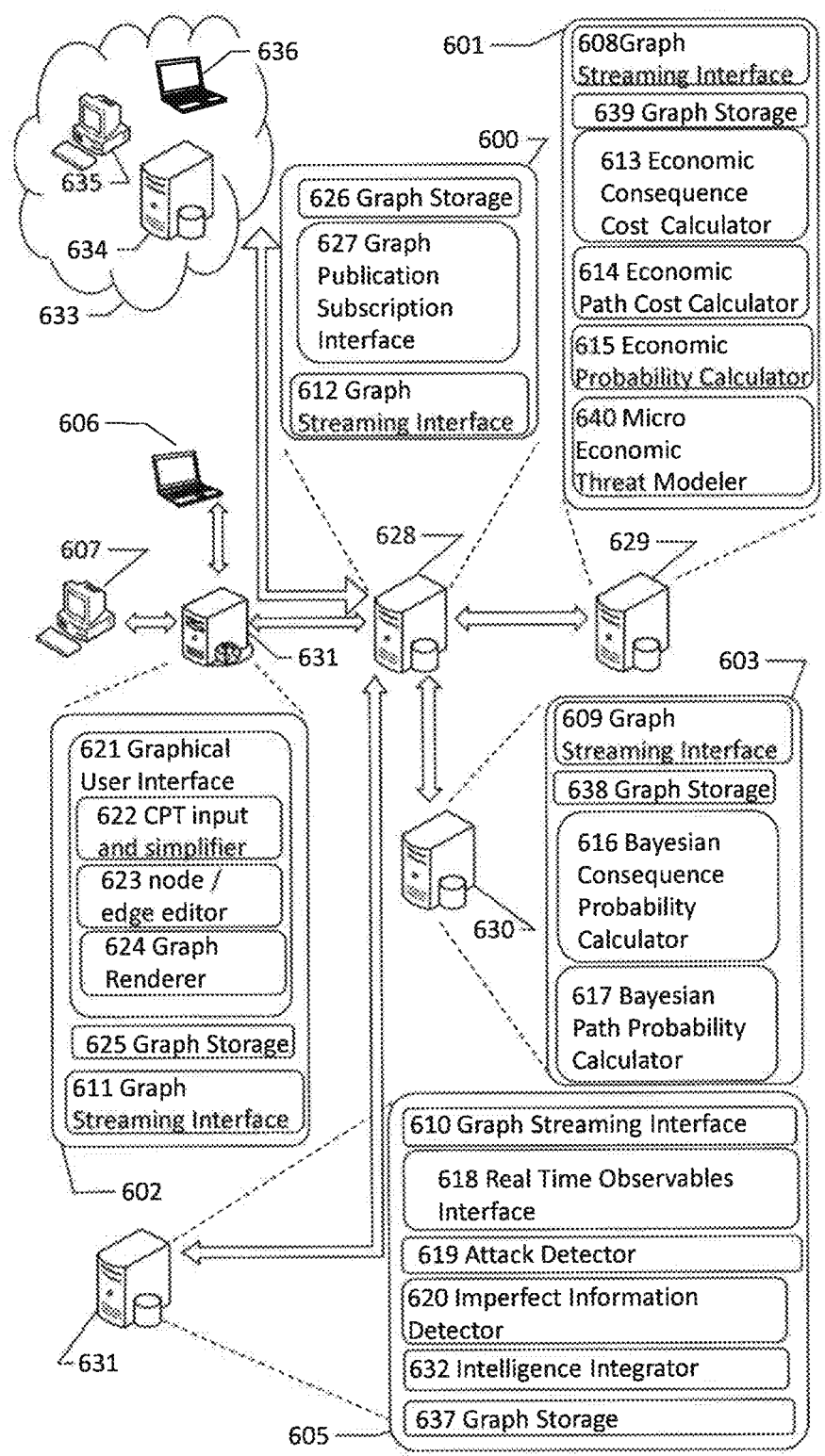
FIG. 6 shows a system diagram of the system for graph generation and storage utilized in one embodiment of the present invention.

FIG. 6 shows a summarized system diagram of the system for graph generation and storage utilized in one embodiment of the present invention. In this depiction, computer may represent one or more computers, including physical systems, virtual systems, or any combination, with various combinations and amounts of various types of memory, processing, and network connectivity.

In the embodiment shown, the Computer 628 hosts a Moirai graph streaming publication/subscription server 600. The Moirai server incorporates graph storage 626, a graph publication/subscription service 627, and a graph streaming interface 612. The graph streaming interface 612 may also be used to send and receive attack graph information to external entities 633 regardless of the remote host format, 634-636. The computer 629 hosts an economic cost and probability calculator 601. The Micro-Economic Threat Modeler, 640, implements the approach to population and cost modeling shown in FIGS. 7 and 8. The calculator 601 and the graph streaming interfaces 608 coordinate graphs with the interface 612. A local representation of the graph is stored in graph storage 639. The economic consequence cost calculator 613 calculates the economic cost of consequences in the graph. The economic path cost calculator 614 calculates the path costs within the graph. The economic probability calculator 615 calculates the probability of a consequence based on the cost, knowledge about the threat actor, and knowledge about other organizations with similar consequences. In alternative embodiments, the calculators 613-615 relate to the graph shown in FIG. 5 and assist in calculating the individual cost.

The computer 630 hosts the Laksis graph Bayesian probability calculator 603. The graph streaming interface 609 coordinates graphs with graph streaming interface 612. A local representation of the graph is stored in graph storage 638. The Bayesian consequence probability calculator 616 calculates the Bayesian probability of consequences using the conditional probability tables stored in the graph. The Bayesian path probability calculator 617 translates the conditional probability tables to edge probabilities and calculates path probabilities through the graph.

The computer 631 hosts an operational and intelligence interface 605. The graph streaming interface 610 coordinates graphs with an interface 612. The real time observables interface 618 receives real time detected observables and integrates them with the graph. A local representation of the graph is stored in graph storage 637. The attack detector 619 uses the observables and the graph to detect attacks. The imperfect information detector 620 detects the existence of imperfect knowledge by either the threat actor or organization. The intelligence integrator 632 integrates intelligence collected externally into the attack graph to facilitate threat modeling.

The computer 631 provides a graphical user interface to the attack graph to clients 606 and 607 through graphical user interface 602. A graph streaming interface component 611 coordinates graphs with an interface 612. A local representation of the graph is stored in graph storage 625. The Graphical User Interface modules 621 include a graph renderer 624, a node and edge editor 623, and a conditional probability table input and simplifier 622.

Case Example

To highlight the advantages of the present invention, the following example is illustrated. A client operating a website on a shared hosting service and has requested a risk assessment from an information security analytical firm.

Threats:

Through discussions with the client, two threats and their associated goals are identified. "Malware Criminals" wish to compromise the website for the purpose of using the client's good reputation to spread malware. The type of malware (e.g., botnet, banking, credential theft) is immaterial. The second threat "hackers" wish to compromise the website for its computational resources. They may wish to use it as an anonymizing proxy, a location to store hacking tools, or a location to execute malicious scans from.

Attack Vectors:

After surveying relevant staff, three primary Attack Vectors are identified: compromise credentials; attack web application; and attack the host services. The "Attack Web Application" attack vector can be expended into: Cross Site Scripting; SQL Injection; Session Hijacking; and Local File Inclusion. For simplicity, the original three attack vectors will be addressed in this example.

Attack Paths:

Based on the attack vectors and knowledge of the field, branching attack paths based off of these attack vectors are identified by interviews with the representatives of the client. Using Table 4 as a rough template, these attack paths are documented. Note that this is neither a clean nor clear description of the attack paths. Instead, the attack paths are an intermediary step necessary to turn the attack vectors into a workable attack graph.

Attack Graph:

Using the attack paths, the appropriate nodes and edges are created to represent the attack graphs, including their interconnectivity, in an attack graph. Once the basic attack paths have been documented in the graph, all paths will include threat actors, goal conditions and consequence conditions. The necessary attributes to appropriately articulate the likelihood of the attack paths within the graph are identified. Additionally, the data tables representing the graph are also generated. For the purposes of manipulating the graph, the data tables provide a more consistent format for editing. As stated earlier, the attack graph makes a poor visualization tool though it can offer some insights. However, only numerical analysis will provide insight into the importance of the affected nodes within the attack graph.

CPTs:

The creation of the CPTs is a critical portion of the risk assessment as it is the actual assignment of risk. However, the use of CPTs complicates a previously simple process. In most existing risk assessment methodologies, the analyst simply assigns a value such as unlikely, likely, or near certainty or a numerical value to a condition or event. In one embodiment, the simple value assigned for risk likelihood is translated into a CPT with minimal human manipulation A conjunctive CPT represents a logical "AND" while the complimentary CPT represents a logical "OR" with the exception that attributes are required for the logical "OR" to be true. By creating these two definitions, two base CPTs are created for analysts to start with, allowing them to simply change the values of rows which have a true value greater than 0. In some alternative embodiments, a third 'default' CPT can also be provided by marking true all rows which have all parents of class attribute and any parents of class actor, event, or condition, true. Additionally, the value of 'false' is expected to always be one minus the value of true. The analyst's task may be simplified by modifying the 'false' value of the CPT. Finally, in many cases, all values of 'true' will be the same. As an example, a node for "Threat has server password", has the same chance of being true regardless of which of the methods for getting the password are used. The input process can be simplified by applying the 'true' value entered in a CPT case to all 'true' values lower in the CPT. In this embodiment, the these simplifications are combined to allow an analyst to choose a conjunctive or complimentary CPT, enter a value for the first potentially 'true' case, and have all further 'true' and 'false' values automatically filled in. Should the analyst desire a more complex CPT, they may easily edit it. In one embodiment, to facilitate transfer of CPTs, CPTS are represented in JavaScript Object Notation (JSON) as documented in Attachment 3: Conditional Probability Tables in JSON).

In support of this example approach, a Graphical User Interface (GUI) implemented in HyperText Markup Language (HTML), Cascading Style Sheets (CSS), and Javascript has been prototyped. It retrieves the JSON representation of the graph over a websocket. If no CPT exists, the GUI dynamically creates a table representing all nodes and sub-tables representing all CPTs. The node and CPT tables are dynamically updated to ensure they remain consistent with the graph. The GUI provides the ability to edit the CPTs, saving them back to the graph. The GUI implements some of the simplifications noted above and will be updated with additional simplifications in the future. In support of visualizing the parent-child relationships expressed in a given CPT, a web canvas is implemented in which the node represented by the CPT and its parents are rendered.

Bayesian Likelihood and Attack Paths:

The process of calculating the Bayesian likelihood of each consequence is typically too intensive to be executed manually. To implement the present invention, the applicant has implemented the Laksis tool to do the appropriate calculations. The Laksis tool performs two primary tasks in support of risk assessment. First, it calculates the Bayesian likelihood for all consequence conditions within the graph. Second, it uses the Bayesian likelihood to identify the most likely paths to each consequence. The tool appropriately accounts for attributes in its calculations. The output of the tool is the consequences prioritized by likelihood and the attack paths for each consequence (from each threat) prioritized by likelihood.

Graph Validation:

It is important that the GUI, Laksis, and all other tools be able to maintain a consistent state of the attack graph. To support this and implement the invention, the applicant has created the Moirai tool. Moira receives, validates, stores, and publishes the state and changes to the state of the graph to all tools utilizing it.

Risk Management:

As illustrated in this example, some embodiments of this invention may be used as a Governance, Risk, and Compliance tool for managing risk. Some embodiments do not just apply to information systems, but any system where rational actors whose goals will likely include negative consequences for the organization being assessed. In other embodiments, this invention may be used to predict the actions of rational actors regardless of their goals. This approach follows the same method analysts follow logically, but provides an easy method for documenting the thought process as well as gaining new insights.

This approach provides two discrete pieces of information: the likelihood that consequences will be reached (and the associated risk realized); and the most likely path to realizing that risk (associated with a specific attacker). In some embodiments, by assigning a time to creation, deletion or changes of nodes within the graph, this information can be phased over time to show the evolution of a security posture. The likelihood, when combined with the impact associated with the consequence may be plotted on a 5×5 risk matrix as is standard in risk management. In some embodiments this may lead to a rating of low, medium, and high.

Engineering Change Evaluation:

In some embodiments, the present invention may be used to quickly prototype mitigations or table-top the effects of zero-day vulnerabilities. By inserting mitigating condition nodes (nodes with a low probability) interspersed on appropriate attack paths, vulnerable conditions (nodes with a high probability), or control conditions (generally nodes with a low probability), and recalculating the likelihood and attack paths, the change in the likelihood of consequences can be measured and extrapolated to the overall change in risk and security posture. Additionally, the change in likely attack paths can be determined from comparing the current and previous attack path lists prioritized by likelihood.

Threat Modeling:

In other embodiments, the invention also provides an analytic solution to problems facing those in the security intelligence community by way of the attack graph model. One area of current industry interest is threat modeling. In order to address the need to be able to take the information that is gathered on threats and their previous exploits, and apply it to an organization's current information systems, the present invention provides two methods for solving that problem.

The first approach begins by calculating attack paths through a graph as described above for a given threat. The organizations current threat intelligence is used to document attack paths which the threat has been observed using. The intelligence-based attack paths can then be compared to the system attack paths. Any attack paths which shares significant overlap in events and conditions (and the same actor) as the intelligence-based attack paths should be highlighted for additional investigation.

The second approach begins by generating the same intelligence-based attack paths as above, but connecting them directly into the attack graph. Create condition nodes for each information system to be assessed and link them as sources to the intelligence-based attack paths. After creating the edges, generate CPTs for the nodes within the attack paths based on the probability that the necessary condition exists in the parent information system. Then, by recalculating the Bayesian likelihood and attack path likelihoods with a single information system set to true at a time, the importance of the intelligence-based kill chain to the information system will be evident.

Operational Attack Sensing:

The inclusion of attributes in the attack graph enables its use as an operational tool. As attributes may be observable (such as IP addresses, Browser Headers, times of day, etc), they overlap heavily with the information available to modem information security sensing tools such as host-based intrusion detection systems (IDSs), network-IDSs, host logs, service logs, and network traffic logs. It is this overlap that is exploited to identify malicious activity.

An event may be temporarily created (such as a netflow) and the graph searched for attributes containing its internal information (source and destination IP addresses, source and destination ports, protocol, and service type). "Netflow" is a Cisco-developed protocol that is widely used/understood by those of ordinary skill in the art in the computer networking industry. "Ipfix" is also a public standard that serves as a current version of netflow. If the attributes already exist, the netflow is linked to them and the CPT updated accordingly. The attribute nodes may be created for the remaining attributes and the netflow permanently left in the graph. While this could cause performance issues unless the graph storage and processing have been carefully designed, it allows for additional insight into malicious activities.

Once created and linked, either temporarily or permanently, a Breath-First Search (BFS) may be done from the event into the attack graph to produce a collection of nodes. Any actors, consequences, and attack paths which are highly correlated with the collection are then identified. Alternately, the same BFS may be conducted, but rather than collecting the identified nodes, identified nodes may have a counter incremented. By increasing this per-node counter when identified through a BFS and decreased temporally, a list of nodes is provided (conditions and events) which is likely to currently exist on the network. This information could be presented as alerts based on a threshold or as a heat map to alert monitoring staff when consequences, attack paths or actors likely exist on the information system.

Both of the above described methods transcend current attack sensing methods. Current IDSs are generally signature based or anomaly based. In the former case, observables produced by malice on the information system must already be known. In the later, a normal baseline must exist for the information system to determine if an observable is an anomaly. These two methods described above require neither signatures nor an understanding of normal events.

In other embodiments, the outcome of the attack sensing may be directly used to control response and recovery actions. In these embodiments, when an attack is sensed, it is immediately responded to in some manner. Some potential methods include but are not limited to modifying network behavior using software defined networking, implementing blocking or black-hole rules on routers, switches or firewalls, or implementing filtering rules on intrusion prevention systems.

If an attack is detected to be successful or potentially succeed, the system may take recovery actions to return to an approved state. Examples of recovery actions may include but are not limited to, purging data, restarting systems, automatically executing failover or automatically initiating disaster recovery plans.

Modeling Legitimate Usage:

In some embodiments, benign actors are added to the attack graph and paths which represent benign actions are added to the attack graph. In this embodiment, by modeling this legitimate use, an organization may utilize differential measurement rather than absolute measurement for attack sensing. By example, when actions are detected on the network from an actor, they may be compared to both the attack path as well as the benign path and the probabilities may be compared rather than only comparing to the attack path and generating an absolute probability as outlined above.

Imperfect Information Modeling and Detection:

In other embodiments, the attack graph is used to conduct 'what-if' scenarios which simulate the difference in knowledge between the threat actor and the organization. This simulated difference may reveal differences in the probability of consequences and attack paths and therefore their priority. These differences allow improved mitigation planning, improved detection, and the ability to detect imperfections in the information an organization has about its security posture.

By example, if an organization has a vulnerability they are unaware of, it may lead to an attack graph with prioritized consequences C(o) and prioritized attack paths P(o). Should a threat actor be unaware of portions of the organization's attack graph, but aware of the vulnerability to which the organization is unaware, the threat actor's attack graph may result in a different set of prioritized consequences C(t) and P(t). By hypothesizing the threat actor's incomplete knowledge as well as the organizations, the organization may identify mitigations with greater value to the organization. The organization may also identify differences in the expected attack paths P(o) and the threat's attack paths P(t). The attack paths may be translated into activity profiles for a network and consequently be detected. Should detected attack paths be more probabilistically similar to P(t) than P(o), it may imply to the organization what information the threat actor has, including information the organization is unaware of (such as unknown vulnerabilities).

Data Portability:

In other embodiments, by broadly defining the attack graph, a method for receiving and distributing information is provided in multiple available formats. Formats such as STIX and VERIS provide construct-based quantizations of information security information. By mapping the elements of these constructs to elements in the graph, information received can be linked in these formats into the graph, improving the assessment. By assigning a construct ID as metadata of a attribute note and then linking to the construct elements at node creation (or by building constructs based on time attributes and relations), these constructs for sharing are created. This allows the organization to utilize information in almost any format given an appropriate mapping. It also provides a method for translating between formats. In one embodiment, the applicant has implemented this portion of the present invention in the Defensive Construct Exchange Standard (DCES).

In other embodiments, attribute nodes are used to define data classifications, the edges can identify all pieces of information which meet a classification. Classifications may be of any number of types. Some examples include: security classifications (Unclassified, Confidential, Secret, Top Secret); handling caveats (personally identifiable information, sensitive but unclassified, etc); or corporate caveats (company proprietary information). This facilitates the sharing of information as information can be clearly distinguished as sharable given a specific context. Additionally, data classifications may be use-case based. Certain portions of the graph may be classified as relevant to law enforcement and incident handlers while others may be classified as relevant to systems administrators and security engineers.

Behavior Prediction:

The invention has been proposed in the context of information security. However, the invention is not specific to information security and it is within the knowledge of a person having ordinary skill in the art to apply these principles to other embodiments may be applied to all human behavior analysis. By identifying actors, event/condition paths, and associated attributes, the present invention could be used to predict probability p(x) of any human action.

In some embodiments, the actors may be benign actors whose actions may or may not lead to impacts, either positive or negative, on an organization. In this embodiment, the actors actions are not 'attack paths', but simply 'paths' and the graph is not an 'attack graph' but a 'rational action graph'. In this embodiment, absorbing states are no longer "consequences", but simply conditions for which the executor of the analysis is interested in understanding the probability of occurring.

Economic Modeling:

In some embodiments, economic principles are used to calculate a probability of action rather than Bayesian probability. In this embodiment, threat actor goals are modeled as goods or services offered for purchase by the target organization and the threat actor is modeled as a consumer. In this embodiment, the attack path represents the cost of 'purchasing' the threat actor's goal (and by extension, the consequence to the organization).

Figure 5:
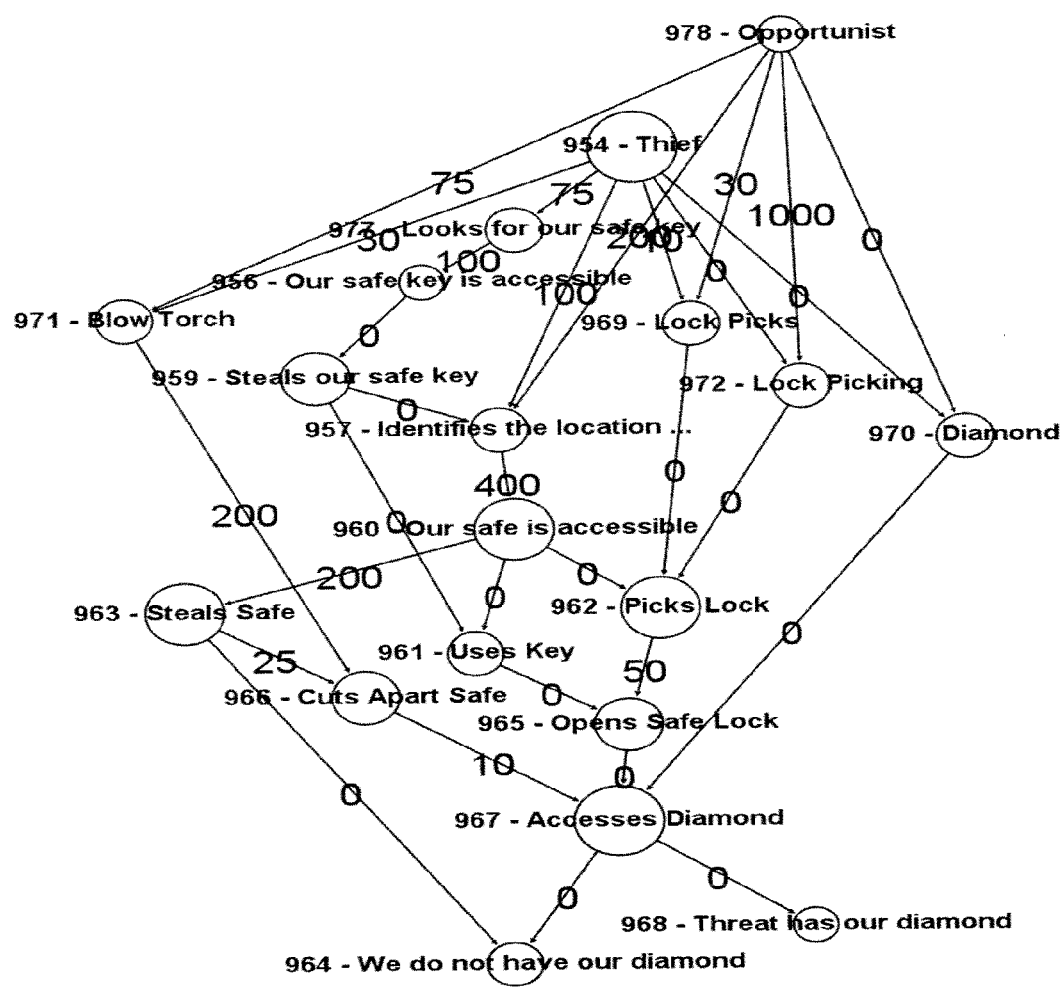
FIG. 5 shows an example of an attack graph with the costs shown on the edges utilized in one embodiment of the present invention.

In some embodiments which utilize the economic model, the likelihood is captured as a cost on the edges rather than as Bayesian CPTs. This simplifies the calculation of likelihood through the graph. The likelihood is the cost of the attack path, plus the cost of all edges necessary for a threat actor to obtain the attributes necessary to realize the attack path. In various embodiments, the cost may be but is not limited to numerical, monetary, objective, or subjective values. FIG. 5 shows the attack graph in FIG. 1 with the addition of a new threat actor and costs encoded on the edges. In this example, the attack graph shows the cost for an individual to hack into an organization's network.

In this embodiment, nodes must be categorized as "and" relationships or "or" relationships as described above. In the case of an "and" relationship, a threat must pay the cost of arriving at all nodes which represent parents to the node being analyzed. In an "or" relationship, a threat must only pay the cost of arriving at one of the parents. In some embodiments, parent requirements may be tracked on a more granularly level encoding specific sets of parents which must be true to allow the node being analyzed to be true. Such an embodiment combines the granularity of Bayesian probability with the simplicity of economic cost modeling of the threat actor's potential attack paths.

Figure 7:
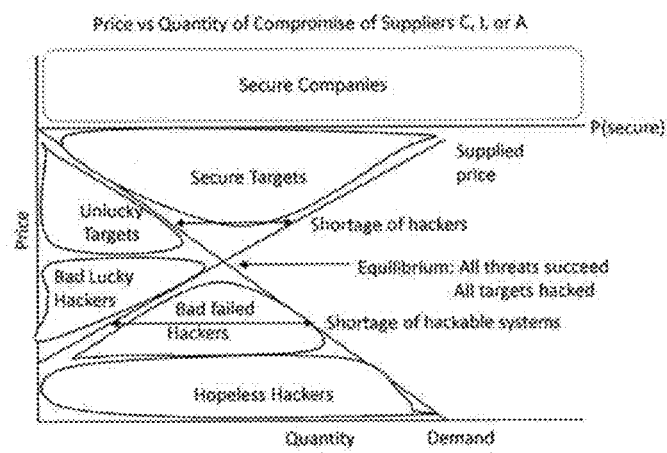
FIG. 7 shows a graphical representation of the economic market for security consequences utilized in one embodiment of the present invention.

In this embodiment of the invention, hackers may be grouped based on their ability to pay the cost to realize a consequence. This relationship also articulates the supply of systems to hack versus the number of hackers wishing to hack systems to achieve their goals. FIG. 7 depicts this relationship by providing a mechanism for an organization with security concerns to predict how many actors are likely to hack into its network.

In this embodiment, a given threat actor may pay multiple costs but may be constrained by a maximum cost. In this embodiment the probability of a consequence being realized is the percentage of threat actors willing and able to pay the cost of realizing the consequence.

Figure 8:
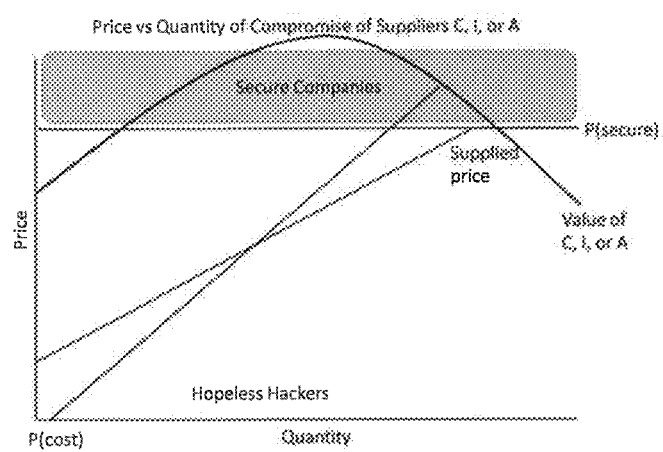
FIG. 8 shows a graphical representation of cost of security consequences and the cost of fixing security consequences utilized in one embodiment of the present invention.

In this embodiment, the organization will attempt to maximize the price of consequences to the point at which no threat actor is willing or able to purchase the consequence. At this point, the organization may be considered secure. Contradictory to most economic models, the increasing of the price of the consequence results in an increased cost to the organization (rather than an increased profit). As such the organization will attempt to minimize its own cost to increase the price of the consequence. As not realizing the consequence has a value, there is a clear point at which the cost of increasing the price of consequences exceeds the cost of the consequence. This relationship is represented in FIG. 8. Once an organization has predicted how many actors are likely to hack into its network as shown in FIG. 7, they may use FIG. 8 to decide how much they want to spend to increase the cost to attackers to hack into the network. Both FIGS. 7 and 8 presume is that the more time/skill/money it costs to hack an organization, the less actors will successfully do so.)

In some embodiments, the price other organizations are offering a threat actor goal (and associated organization consequence) at is also calculated based on an attack graph for the other organization. In this embodiment, the quantity of consequences 'sold' will be first taken from the organizations offering them at the lowest cost, increasing in cost until all demand for the threat actor goal has been satisfied. In this embodiment, it is the organizations goal to increase price of their consequence to a point above the cost at which all demand is satisfied and below the value of not realizing the consequence. To this end they may wish to minimize product differentiation (i.e. differences in the perceived value of their consequence to threat actors) so as to increase the market and decrease their likelihood of being a supplier.

In some embodiments, the sophistication of the threat actor is accounted for. This may be represented as different costs for a threat actor to acquire an attribute. By example, a threat actor may be capable of learning mobile device hacking easily and therefore have a lower cost to acquire the knowledge than another threat actor. Alternately, a threat actor may already have the knowledge and effectively have a cost of zero to acquire it.

Graph Schema:

In some embodiments, a graph schema is used to enforce the integrity of the attack graph and provide a framework for associated other information such as monitored operational information and shared information. A "graph schema" is a representation which defines the structure, content, and to some extent, the semantics allowed in a graph said to meet the schema. Generally, a graph schema is a graph it's self, but in a generalized form. It may indicate a set type, attributes, or relationships that nodes may have. A simple example would be a graph where nodes are defined as either customers or stores; the store nodes having store names while the customer nodes having first and last names. The relationships, having all of type 'shops at' are only allowed to go from customer nodes to store nodes.

Penetration Testing:

In some embodiments, the attack graph may be used for penetration testing. By using the attack graph as an input to a penetration test tool, a penetration test may be made repeatable and deterministic while accurately covering all attack paths of interest.

In some embodiments, the penetration test tool would determine which nodes it had reached in an attack graph and then attempt to execute the child event nodes when all parent node requirements were satisfied according to the conditional probability table. After executing an event node, the penetration test tool would reassess which condition nodes were now true and update the reached nodes in the attack graph accordingly. The penetration test tool would repeat the process until a consequence was reach or it could progress no further.

Training:

In some embodiments, the attack graph may be used for incident response training. In these embodiments, an attack tool would execute or simulate the events and conditions in the attack graph as well as the observables which would be generated by those events and conditions. The trainee would receive the output of those observables, helping them identify attacks and allowing them to practice defending against them. In some embodiments, the execution would be repeatable to allow repeated training and testing. In other embodiments, the execution would be randomly chosen allowing for variety in training.

As depicted in the examples of various embodiments, the present invention may be implemented by a computer system to process the information and data gathered during the process. The volume of information processed, combined with the speed at which the information must be processed, makes the use of a computer system advantageous. The computer system will typically have a processor, such as central processing unit (CPU), where the processor is linked to a memory, an input, and an output. A network computer may include several other components as well. For example, the memory components may include a hard disc for non-transitory storage of information, as well as random access memory (RAM). The input components may include a keyboard, a touchscreen, a mouse, and a modem for electronic communication with other devices. The output components may include a modem, which may be the same modem used for the input or a different one, as well as a monitor or speakers. Many of the different components may have varying physical locations, but they are still considered a computer for purposes of this description. For example, the memory may be on a hard drive in the same physical device as the processor, or the memory component may be remotely located and accessed as needed using the input and output. The memory may also have one more programs to carry out the functions described previously. The memory components may also have one more databases along with related data.

CONCLUSION

Information security to this point has primarily been concerned with engineering and development, (i.e., building a system perfectly). The present invention demonstrates attack graphs based on progressive attack paths. It also demonstrates the use of attributes to provide accurate requirement of precursors as well as attack sensing and shows applications to engineering and development (risk assessment and attack path identification), intelligence (threat intelligence and information sharing), and operations (attack sensing).

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method for analyzing computer network security, comprising:
   establishing multiple nodes, where each node represents an actor, an event, a condition, or an attribute related to the network security;
   creating an estimate for each node that estimates the ease of realizing the event, condition, or attribute of the node;
   identifying attack paths based on attack vectors that may be used by actor, where the attack paths represent a linkage of nodes that reach a condition of compromise of network security;
   calculating edge probabilities for the attack paths based on the estimates for each node along the attack path, where the node estimates and edge probabilities are determined by calculating a probability of likelihood for the nodes based on Markov Monte Carlo simulations of paths from an attacker to the nodes;
   generating an attack graph that identifies the easiest conditions of compromise of network security and the attack paths to achieving those conditions of compromise based on combined estimates of the ease of the attack paths and the application of actor attributes;
   where events and conditions on the attack graph are connected to observable nodes associated with physical sensors on the network, where the physical sensors predict the events and conditions; and
   detecting attacks on the computer network through a correlation of the observable nodes with the physical sensors.

2. The method of claim 1, where the node estimates and edge probabilities are determined by,
   assigning conditional probability tables (CPTS) to each node in the attack graph, where creation of the CPTs is simplified by,
      defining complimentary ("AND") CPTs,
      defining conjunctive ("OR") CPTs, and
      assigning the conjunctive CPT as the 'default' CPT, and
   using Bayesian inference to calculate the probability of each node estimate based on its CPT To improve performance and where calculation of the Bayesian inferences are stopped when probabilities for all condition nodes estimates have been calculated.

3. The method of claim 1, where the physical sensors are selected from the group consisting of: a host-based intrusion detection systems (IDSs), network-IDSs, host logs, service logs, and network traffic logs.

4. The method of claim 1, where the ease of realizing nodes estimates are calculated using the economic costs by,
   assigning probabilities to the edges within the attack graph using a price-quantity model, where the probabilities are represented as an economic cost, and
   calculating a probability for the node estimates based on edge economic costs.

5. The method of claim 1, where knowledge collected on attacker paths are used to:
   form the attack graph based on observed transitions between events and conditions;
   calculate the edge probabilities based on the relative occurrence of the observed transitions; and
   calculate a probability of likelihood for the nodes based on Markov Monte Carlo simulations of paths from an attacker to the nodes.

6. The method of claim 1, where logically similar but different nodes are determined to represent the same event, condition, actor, or attribute using natural language processing and are merged to form a single node.

7. The method of claim 1, where potential mitigations are added as events or conditions to the attack graph and the edge probabilities and node conditions are recalculated to compare the benefit of potential mitigations to the most likely attack paths.

8. The method of claim 7, where security alerts are generated in response to detected attacks.

9. The method of claim 8, where the security alerts produce an automated change in the computer network to attempt to prevent the actor's action and realization of nodes.

10. The method of claim 8, where the attack graph is used to identify which sensors would generate security alerts related to one or more attack paths.

11. The method of claim 1, where nodes are assigned a relationship to other nodes representing a security classification that influences the handling and sharing of the data.

12. A method for analyzing computer network security, comprising:
    establishing multiple nodes, where each node represents an actor, an event, a condition, or an attribute related to the network security;
    establishing multiple edges representing progression, predicate, and requirement relationships;
    establishing nodes that are observed using sensors installed in the computer network and connected to events and conditions in an attack graph;
    creating an estimate for each node that estimates the ease of realizing the event, conditions associated with risks, or attribute of the node;
    identifying events and conditions to mitigate to prevent risks;
    identifying attack paths, where the attack paths represent a linkage of nodes that reach a risk;
    assigning node probabilities for the attack graph;
    calculating edge probabilities for the attack paths; and
    generating an attack graph that identifies the easiest conditions of compromise of network security and the attack paths to achieving those conditions of compromise based on combined estimates of the ease of the attack paths and the application of actor attributes, where events and conditions on the attack graph are observed using physical sensors installed in the computer network, and where the physical sensors are connected to observable nodes with edge probabilities; and
detecting attacks on the computer network through a correlation of the observable nodes with the physical sensors.

* * * * *